United States Patent [19]

Takata et al.

[11] Patent Number: 4,720,245

[45] Date of Patent: Jan. 19, 1988

[54] FLOW RATE CONTROL SYSTEM IN FLUID SUPPLY AND DRAIN APPARATUS

[75] Inventors: Nobuharu Takata, Hyogo; Sachio Nakashima, Nagasaki, both of Japan

[73] Assignee: Mitsubishi Denki Kabushiki Kaisha, Japan

[21] Appl. No.: 923,090

[22] Filed: Oct. 24, 1986

[30] Foreign Application Priority Data

Oct. 25, 1985 [JP] Japan .................................. 60-239057
Jan. 8, 1986 [JP] Japan ...................................... 61-641
Jan. 9, 1986 [JP] Japan ..................................... 61-2814

[51] Int. Cl.⁴ .............................................. F04B 49/00
[52] U.S. Cl. ......................................... 417/28; 417/295
[58] Field of Search .................... 417/26, 28, 45, 295

[56] References Cited

U.S. PATENT DOCUMENTS 3,007,414 11/1961 Long et al. ............................ 417/28
4,181,099 1/1980 Binstock .......................... 122/448 R
4,225,289 9/1980 Borhoff ................................. 417/26
4,566,289 1/1986 Iizuka et al. ........................... 417/45

FOREIGN PATENT DOCUMENTS 58-6077 2/1983 Japan .

Primary Examiner—William L. Freeh
Attorney, Agent, or Firm—Bernard, Rothwell & Brown

[57] ABSTRACT

The present invention relates to a flow rate control system in an apparatus for supplying and draining fluid such as air and water, etc. and particularly in a fluid suply and drain apparatus comprising a motor for driving fluid flowing apparatus such as a fan and a flow rate control device such as a damper which is capable of shielding the flow path. The number of the rotations of motor is controlled step by step in accordance with the flow rate of fluid flowing through a flowing path on the occasion of operating the motor with the variable frequency power supply of which the output frequency changes depending on a command request of the fluid flowing apparatus as a load, also controls the flow rate control device in accordance with deviation between the command request from the load and a staircase control input to the variable frequency power supply even when the flow rate changes minutely at each step. Fine control of the desired flow rate is achieved by adjusting the number of rotations of motor and the amount of the opening angle of the flow rate control device.

4 Claims, 14 Drawing Figures

NUMBER OF ROTATIONS OF FAN (RATIO)

(a)     (b)

FLOW RATE CONTROL SYSTEM IN FLUID SUPPLY AND DRAIN APPARATUS

BACKGROUND OF THE INVENTION

1. Field of the Invention

The present invention relates to a flow rate control system to be adopted to the apparatus which supplies or drains, for example, gas and liquid such as air and water as the fluid and more specifically to a system which controls a flow rate of fluid to be supplied or drained by a fluid flowing means through the control of a number of revolutions of a motor which drives the fluid flowing means such as a fan which defines the fluid as a load and causes this fluid load to flow.

2. Description of the Prior Art

In an ordinary fluid supply and drain apparatus providing a blower or a pump, etc., a flow rate of fluid to be supplied or drained can be controlled by driving a load of fan or pump with a driving means such as a motor, controlling this driving means and adjusting a flow rate control means such as a damper, valve and static wing, etc.

As an apparatus and a method for controlling a load and a driving means for the load, there is known prior art. One was filed as an application on Feb. 2, 1983 and is described in the Published Japanese Patent No. 58-6077 and the other is described in the U.S. Pat. No. 4,181,099 (Jan. 1, 1980).

The patent entitled, "Method for Operating a Load such as Fan to be Driven by a Motor" described in the Published Japanese Patent No. 58-6077 utilizes a flow rate control system shown in the block diagram of FIG. 1 and explained below. In FIG. 1, 1 is a commercial power supply. 2 is a variable frequency power supply (VVVF). 3, 4 are switches. 5 is a motor. 6 is a fan as a means which supplies a fluid such as air. 7 is a rotation detector which detects a number of rotations of a motor such as a specified speed generator.

Operations are then explained. A synchronous motor is used as a motor 5 and it is supposed that VVVF 2 copes with a load up to the amount of wind at a speed of 80%. In this case, the switch 3 is opened and the switch 4 is turned ON for the flow rate up to 80% speed and moreover the motor 5 is driven with VVVF 2. When the flow rate of 80% speed or more is required, a damper as a fluid control means is closed in order to keep light the load of motor 5 and the frequency of VVVF 2 is raised up to a value a little higher than that of the commercial power supply. In this case, an armature voltage is kept constant by field control. When the frequency of motor 5 reaches a point a little higher than the commercial frequency, the switch 4 is opened, the synchronous field is enhanced and set to the commercial power supply voltage and the switch 3 is turned ON when the outputs of commercial power supply 1 and motor 5 are matched in the phase within the allowable error. Thereby, the input of motor 5 can be switched to the commercial power supply 1 from VVVF 2 without an excessive transient phenomenon.

Meanwhile, in case the flow rate of 80% speed or less is required again, the switch 3 is opened in order to reduce a number of rotations of motor 5. The frequency of VVVF 2 is changed synchronously with a signal of the detector 7 which detects a number of rotations of motor 5 and it is operated synchronously with the output frequency of motor 5. When the number of rotations becomes lower than 80% speed the switch 4 is turned ON. Thereby, the motor 5 can be connected with VVVF 2. This operation can be employed even when an induction motor is used as the motor 5.

In case the motor is controlled as explained above, the relation between fan input and the number of rotations of fan is indicated by the characteristic of FIG. 2. Effective energy saving can be realized by saving the fan input indicated as the hatched region in FIG. 2.

The flow rate control system shown in FIG. 3 is proposed to more practically realize the method for operating a fan, etc. described above.

In the block diagram of FIG. 3, 11 is a commercial power supply. 12 is a switch. 13 is a variable ferquency power source (VVVF). 14 is a fan motor. 15 is a fan (including a vane). 16 is a coupling axis. 17 is an air duct for air moved by the fan 15. 17a, 17b are an inlet and an outlet respectively, for air flowing through the air duct 17. 18 is a damper as a flow rate control means housed in the air duct 17. 19 is a driving rod for damper 18. 20 is a damper driving apparatus. 21 is a control apparatus which generates a control input to VVVF 13 and damper driving apparatus. 22 is a transformer. 23 is a detector for number of rotations. 24 is a load detector. 23a, 23b are contacts which are actuated OFF and ON when the detector 23 operates. 24a, 24b are contacts which are actuated OFF and ON when the load detector 24 operates. 25 is a fixed control input giving a signal which makes constant the output of VVVF 13. 28 is a control input terminal to the driving apparatus 20.

Operations are explained. The fluid flow control apparatus keeps a rotating speed of fan motor 14 for the present flow rate $Q_L$ so that the speed does not go below a certain number of rotations $N_L$ and the opening angle of damper 18 is kept small as shown in FIG. 4 for a flow rate lower than $Q_L$. The practical control is carried out in the following way. Namely, an output frequency f and an output voltage V of the variable frequency power supply 13 are in a functional relation. Therefore, when a frequency f is determined, an output voltage V is also determined uniquely. In other words, the equation (1) can be obtained.

$$V = g(f) \quad \ldots \quad (1)$$

Where, g: function.

Usually, the equation (2) is used in order to avoid saturation of the winding of the motor.

$$g(f) = K f \quad \ldots \quad (2)$$

Where, K is constant.

From above explanation, it is apparent that an output frequency f can be detected from an output voltage V of variable frequency power supply 13. Therefore, a detector for a number of rotations 23, which detects a frequency, can be employed and therefore a number of rotation N below the constant value $N_L$ can be obtained from the equation (1) by changing an output voltage V of the variable frequency power supply 13 to a value suitable for measurement through transformer 22 and detecting a value lower than the constant value.

When the number of rotations N is higher than a constant value $N_L$, the number of rotation detector 23 does not operate and therefore the load detector 24 also does not operate and thereby the contacts 24a, 23b are OFF, while the contacts 23b, 24b are ON. Therefore, in this case, a control signal of the control apparatus is applied to the variable frequency power supply 13, while a control input is applied to the damper driving apparatus 20. A damper opening angle $\theta_c$ in the vicinity of full opening can be obtained for the range of flow rate of $Q_L \sim 100\%$ in FIG. 4.

When the number of rotations N attempts to go below a constant value $N_L$, the detector 23 operates, causing the contact 23a to become ON and the contact 23b OFF. When the contact 23a becomes ON, and load detector 24 becomes operative, but since setting is made so that it becomes inoperative when flow rate Q is smaller than the flow rate $Q_L$ corresponding to a number of rotations $N_L$, the contacts 24a, 24b are respectively OFF, ON. Accordingly, a fixed control input is applied to the variable frequency power supply 13 and the number of rotations is fixed at $N_L$ and a control input of the control apparatus 21 is given to the damper driving apparatus 20. In the range lower than the flow rate $Q_L$, an output frequency $f_L$ of the variable frequency power supply 13 is fixed to a value indicated by the equation (3), and it is shown in FIG. 4(a).

$$f_L = N_L \times (P/120) \ldots \quad (3)$$

When a control signal of control apparatus 21 is given to the damper drive apparatus, the damper 18 operates providing the requested flow rate and the damper 18 is squeezed in a range lower than the flow rate $Q_L$ as shown in FIG. 4(b). Next, the method for returning the opening angle of damper to the original opening $\theta_C$ when the flow rate Q exceeds $Q_L$ from the condition described above is explained hereunder.

When the rotation detector 23 is operating, and the contact 23a is ON the the load detector 24 is operable. When the requested flow rate increases and the control signal of control apparatus 21 increases while an opening angle of damper reaches $\theta_C$, the load detector 24 operates, making the contacts 24a, 24b ON and OFF. Therefore, a control input is applied to the damper driving apparatus 20 so that it is fixed at the damper opening angle $\theta_C$ and the signal of control apparatus is applied to the variable frequency power supply 13. When the frequency f further increases, the rotation detector 23 restores to the initial condition of flow rate $Q_L \sim 100\%$.

However, the existing flow rate control systems described above have the problems to be explained below.

First, safe operation is assured for entire range of load but investigations for variations of comparatively small load are not yet carried out. For example, a large supply current from VVVF 2 is necessary to increase the velocity for increase in load while the VVVF 2 is operating under the 80% load in FIG. 2 and the capacitance of VVVF 2 must be increased as much as such amount. Meanwhile, for reduction in load, rotating speed of the motor 5 operated by VVVF 2 is naturally reduced and a response rate is low for the load having large value of $GD^2$ such as a fan 6. When a recovery braking function is added to improve such response rate, VVVF 2 becomes large in size and also becomes expensive.

Even in case the flow rate control system explained with reference to FIG. 3, FIGS. 4(a)(b), the fan motor 24 is controlled in such a manner that it continuously changes from $N_L$ to 100% rotation region. Therefore, if a resonant point of mechanical oscillation frequency of the fan 25 lies in a certain region of the continuously variable frequency, mechanical oscillation is amplified, resulting in a problem such as failure of fan 25.

Moreover, the existing flow rate control system contains a problem that the energy saving effect is lowered in comparison with that where the damper is used under the full opening condition because the damper is operated in the direction of opening for increase of load as the assistance for quick control response since the control of opening of the damper 18 is also employed in parallel and therefore opening of damper must be set to about 50° in order to improve controllability.

SUMMARY OF THE INVENTION

It is an object of the present invention to provide a flow rate control system which assures fast response time for increase of load without increase of capacity of VVVF and also fast response time for decrease of load without addition of a recovery braking function.

It is another object of the present invention to provide a flo rate control system which safely drives the fan and fan motor even in case the mechanical resonant point lies in the power supply frequency region.

It is further object of the present invention to provide a flow rate control system which is capable of controlling the speed of a driving means with economical consumption of power energy and sufficiently assuring fast response time for increase or decrease of load in order to attain the first object explained above.

In order to attain the objects explained above, the flow rate control system in the fluid supply and draining apparatus incorporated in the present invention comprises a motor which is driven by a variable frequency power supply which changes output frequency in accordance with a command request from a load, a fluid flowing means which is driven by such motor and is provided in the flowing path of fluid to cause such fluid to flow and a flow rate control means such as a damper which shields the flowing path of fluid, and controls step by step the speed of such motor in accordance with a flow rate of fluid on the occasion of driving the motor with the variable frequency power supply and executes the fine control for fine changes of flow rate in each stage by adjusting the flow rate control means based on the deviation between the command request from the load and staircase control input to the variable frequency power supply.

DETAILED DESCRIPTION OF THE PREFERRED EMBODIMENTS

Several preferred embodiments of flow rate control system in the fluid supply and drain apparatus incorporated to the present invention are explained in detail with reference to attached drawings.

The first embodiment is explained by referring to FIG. 5 to FIGS. 7(a),(b).

Figure 1:
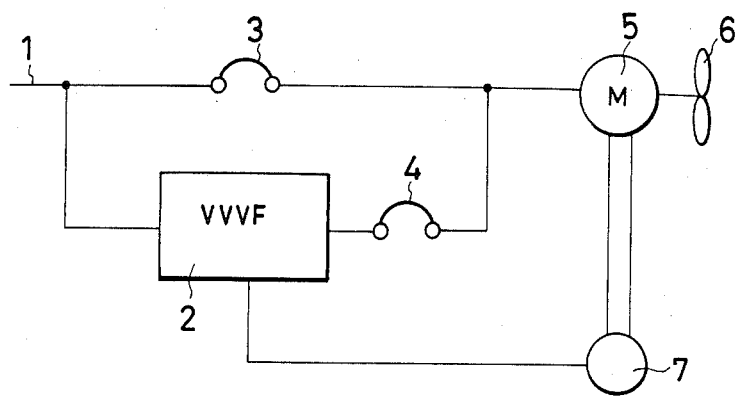
FIG. 1 is a block diagram of an example of existing flow rate control system in the fluid supply and drain apparatus.
Figure 2:
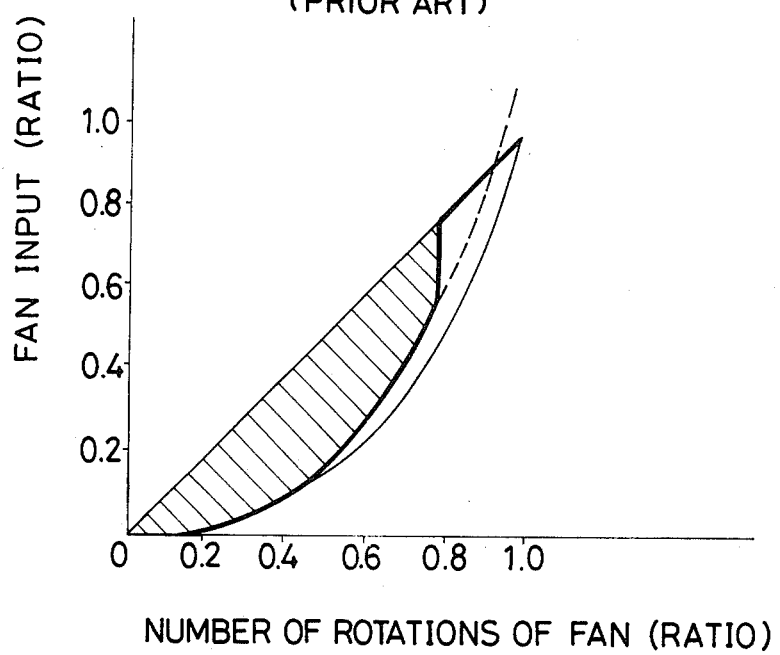
FIG. 2 is a characteristic diagram showing the principle of control for the flow rate control system.
Figure 3:
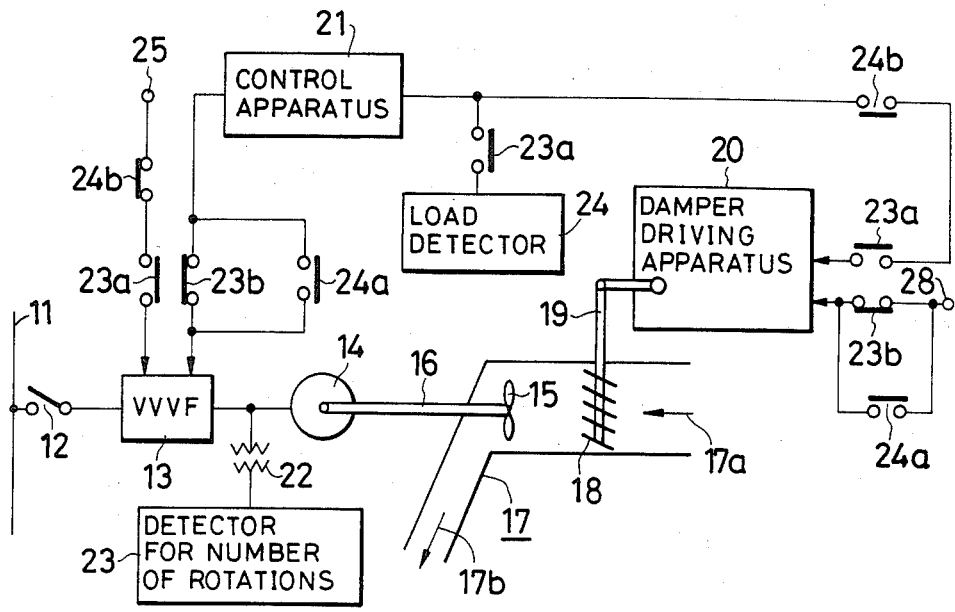
FIG. 3 is a block diagram showing another example of an existing flow rate control system.
Figure 4:
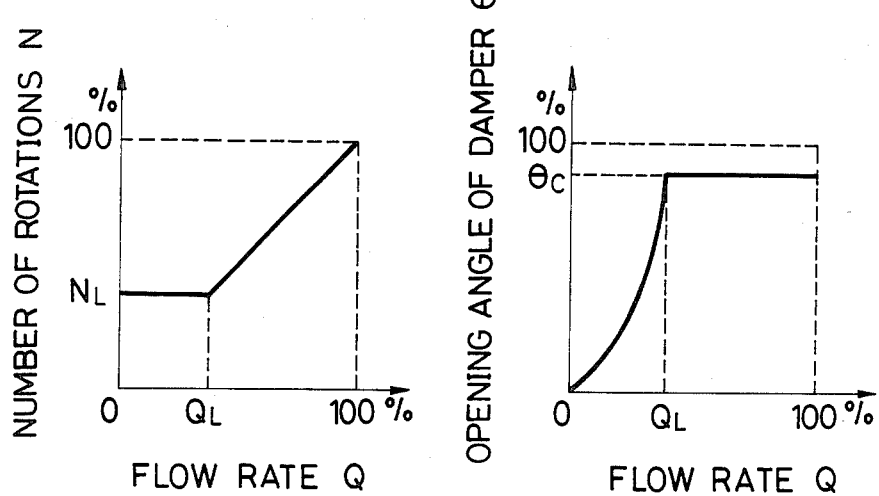
FIGS. 4(a),(b) are characteristic diagrams respectively showing the relations between the flow rate of fluid in the flow rate control system shown in FIG. 3 and a number of rotations of motor and opening angle of damper.
Figure 5:
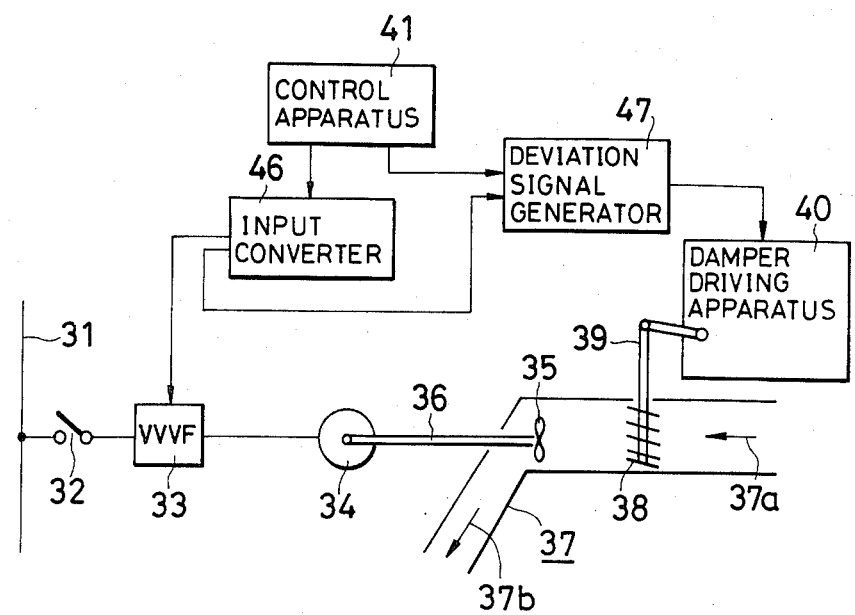
FIG. 5 is a block diagram of the first embodiment of the flow rate control system of fluid supply and draining apparatus incorporated in the present invention.

In FIG. 5, 31 is a commercial power supply. 32 is a switch. 33 is a variable frequency power supply (VVVF), 34 is a fan motor. 35 is a fan (including a vane). 36 is a coupling axis. 37 is an air duct for the air moved by the fan 35. 37a, 37b are air inlet and exit, respectively, of air duct 17. 38 is a damper as a flow rate control means housed within the air duct 17. 39 is a driving rod of damper 38. 40 is a damper driving apparatus. 41 is a control apparatus which generates control input to the VVVF 33 and damper driving apparatus 40. 46 is an input converter which converts a continuous control signal output from the control apparatus 41 to a staircase signal. 47 is a deviation signal generator which generates a signal corresponding to deviation between the continuous control signal and the staircase signal.

Figure 6:
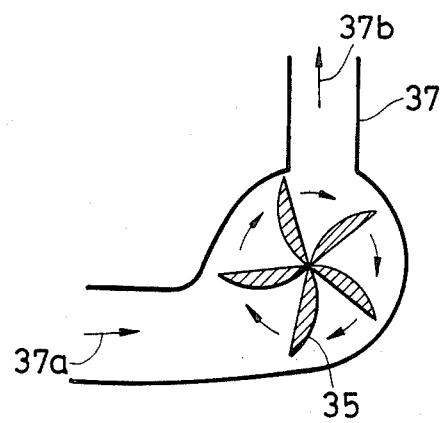
FIG. 6 is a schematic diagram of structure indicating in detail the flow path and fan arranged at a part of FIG. 5.
Figure 7:
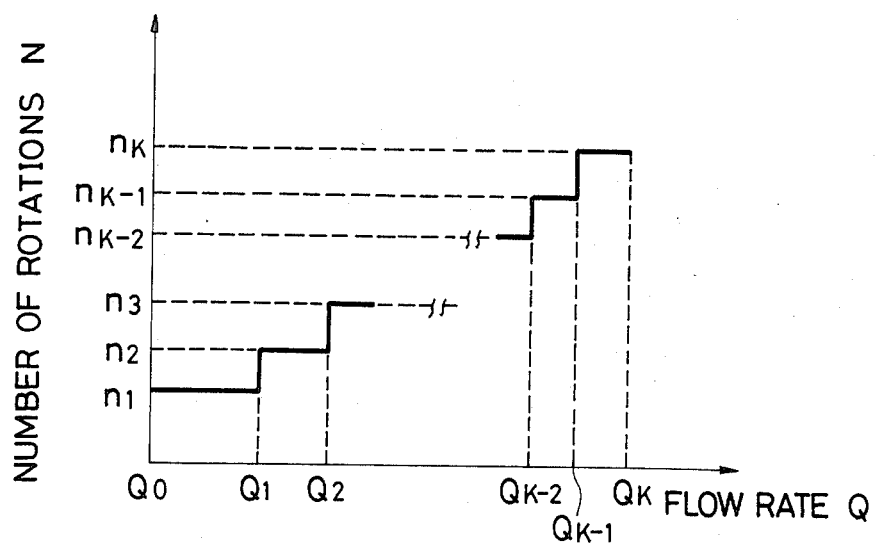
FIGS. 7(a),(b) are characteristic diagrams respectively showing relations between the flow rate of fluid in the embodiment of FIG. 5 and a number of rotations of motor and an opening angle of damper.
Figure 7:
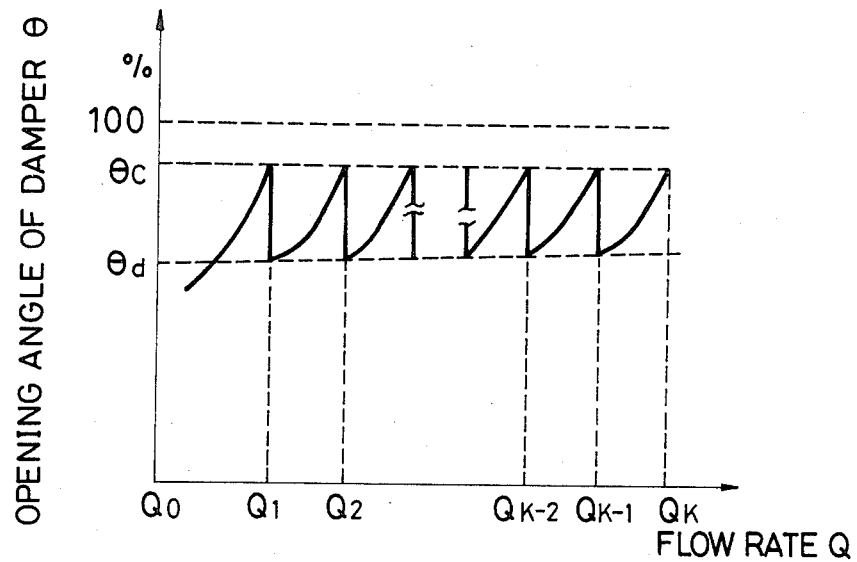

Operations are then explained. When the fan motor 34 is driven, the fan 35 receives mechanical shock due to variation of air pressure every time each blade of fan 35 passes the exit 37b of air duct 37 as shown in FIG. 6. When the number of blades is Z and the number of rotations of fan 35 is X (RPM), vibration R of this mechanical shock is expressed by Z X(RPM) and there is a high probability that it may be matched with the natural vibration of fan 35, particularly a fan which has a complicated structure and includes many blades. The resonance generated by the mechanical part includes the vibrations caused by the fan motor 34, fan 35 and coupling axis 36. In the case of this invention, the continuous control signal Y of the control apparatus 41 is converted to staircase signals $Y_0, Y_1, Y_2, \ldots Y_K$ by the input converter 46 and it is thereafter supplied to the VVVF 33. Here, if a frequency control input to the VVVF 33 is assumed as $Y_i$ ($Y_{i-1} < Y < Y_i$), the output frequency of VVVF 33 changes step by step and, as a result, the number of rotations of fan motor is changed as indicated by $n_1, n_2, \ldots, n_K$ in FIG. 7(a).

Meanwhile, the inputs of the control apparatus 41 and input converter 46, namely deviation between the staircase control inputs $Y_0, Y_1, \ldots, Y_K$ and command request of load of control input apparatus 41 can be obtained by the deviation signal generator 47. The driving apparatus operates in accordance with such deviation and thereby the opening angle of damper is controlled and it is fine adjusted to the target value corresponding to the requested flow rate conforming to the control signal. Therefore, in case the requested flow rate Q is indicated by $$Q_{i-1} \leqq Q \leqq Q_i \qquad \ldots (4)$$

the number of rotations N of fan motor become $n_i$ and the opening angle of the damper 38 changes between $\theta_c$ and $\theta_d$. The number of rotations N of fan motor is selected step by step and thereby the frequency (number of rotations) of resonance of fan 35 can be freed from matching with the number of rotations of ordinary fan motor.

In above embodiment, the fan 35 is connected as a load of fan motor 34 but the load is not limited only to such fan and it can be replaced with another rotating body such as a pump, etc.

In above explanation, flow rate is controlled by the damper 38 but any kind of mechanical control system such as vane, valve, etc. also provides a similar effect.

Moreover, in FIG. 7(b), the opening angle of the damper is changed between $\theta_c$ and $\theta_d$ for simplification. These vaues $\theta_c, \theta_d$ may be different between the flow rates $Q_{i-1}$ and $Q_i$.

The above explanation is directed to avoidance of the resonant point, but a fan 35 usually has operation disable region such as the surging region where operation becomes unstable and the present invention is effective to eliminate such region and can be applied generally to eliminating the operation disable region of a rotating body such as a fan, etc.

Moreover, the present invention provides such a secondary effect that since the fine adjustment of load is carried out with the damper 38, a recovery device has been required for VVVF 33 in the prior art in order to increase the speed in the direction where a number of rotations is reduced, but the system of the present invention does not require such a recovery device.

The second embodiment of the present invention is explained below.

Figure 8:
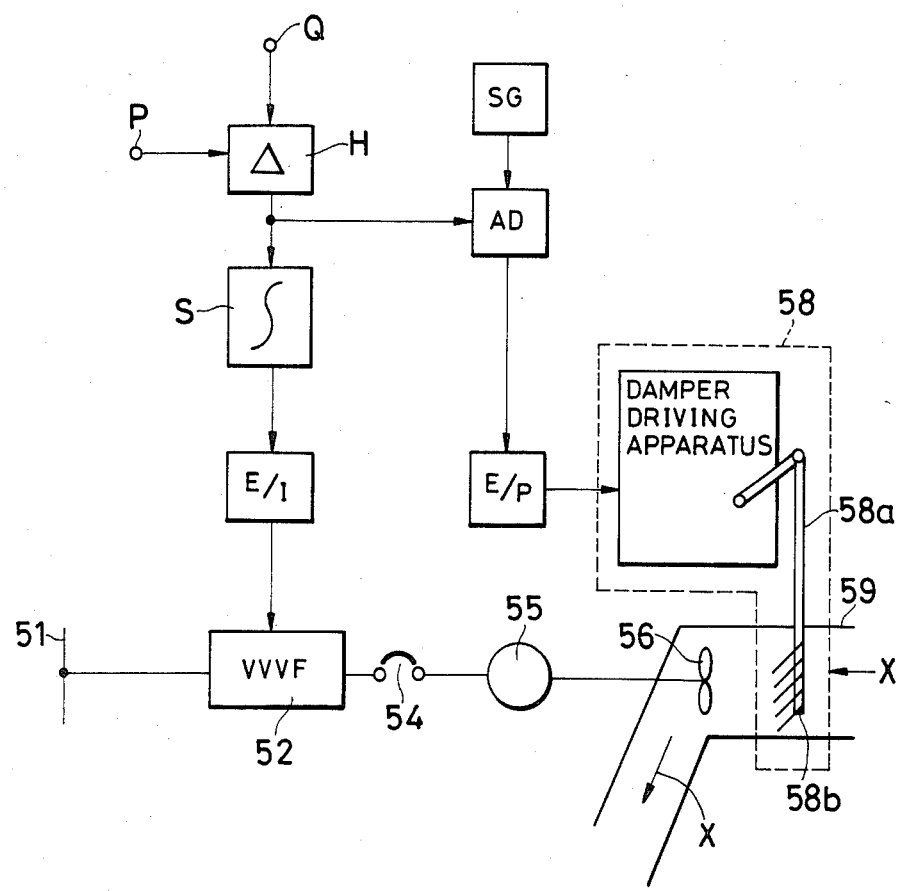
FIG. 8 is a block diagram showing the second embodiment of the present invention.

In FIG. 8, 58 is a damper apparatus as a fluid control means for the fluid such as air. 58a is a driving rod of the damper apparatus 58. 58b is a damper body provided in the fluid flow path 59. P is a flow rate setting signal sent from a setting device (not shown) which presets the required flow rate. Q is a flow rate measuring signal from a measuring equipment. SG is a setting signal generator which generates a signal for specifying an opening angle of damper used as the fluid control means and designates the setting of the control. H is a deviation detector which detects deviation between the flow rate setting signal P and flow rate measuring signal Q. S is a proportional integrator. AD is an adder. E/I is a voltage/current converter as a first signal conversion means. E/P is a voltage/pressure converter as a second signal conversion means. 51 is a commercial power supply. 52 is a variable frequency power supply (VVVF). 54 is a switch. 55 is a motor. 56 is a fan.

Operations are then explained. The operation in case the flow rate setting signal P and the flow rate measuring signal Q match, namely in case a load is not changed is first explained hereunder. In this case, since the output of the deviation detector H is zero, the output of integrator S is constant and therefore the value of this output (voltage) is converted to a current keeping the output frequency of VVVF 52 to the specified value and thereby the number of rotations of motor 55 and fan 56 is maintained at the specified value. Meanwhile, since the output of the deviation detector is zero, the output of the adder AD becomes equal to an output of the setting signal generator SG. This value is converted to a pressure by the voltage/pressure converter E/P and is then applied to the damper 58, holding the damper body 58b to the specified opening angle through the driving rod 58a. As a result the amount of air flowing to the exit from the inlet in the direction of arrow mark X becomes a value corresponding to the measuring signal Q.

Figure 9:
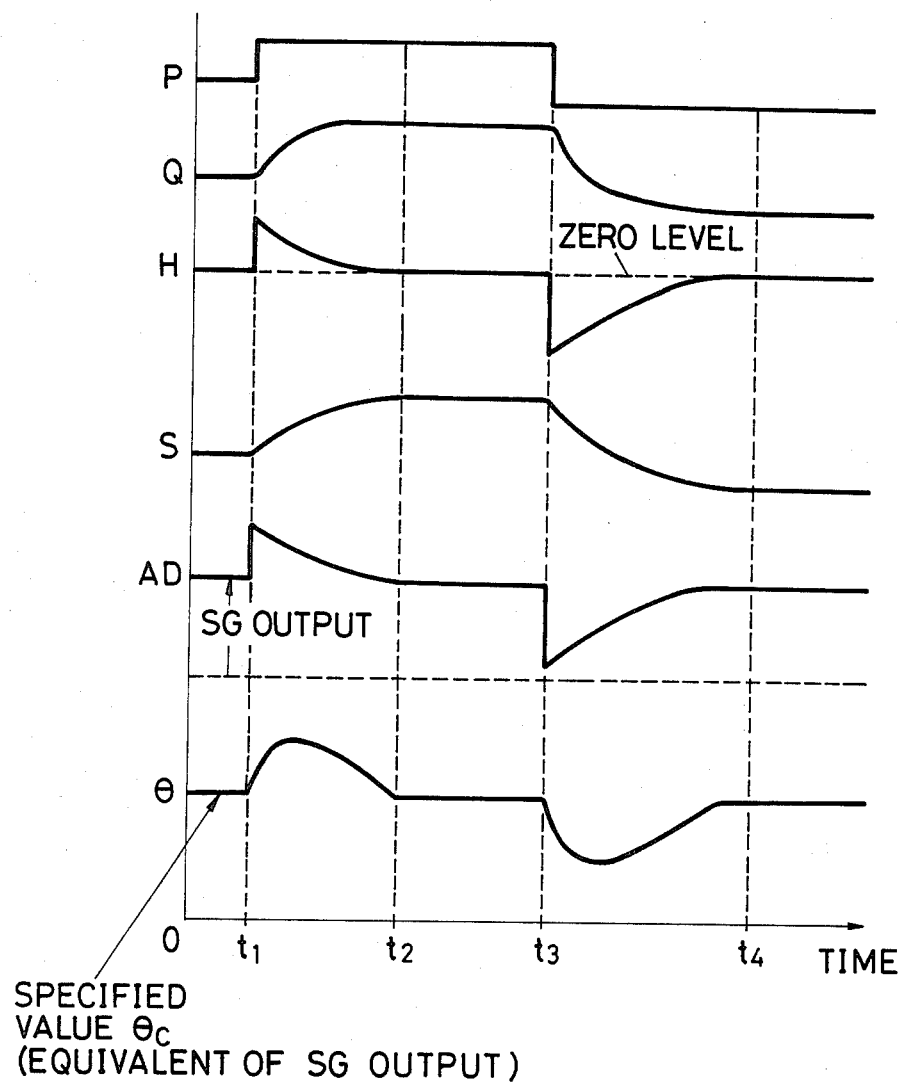
FIG. 9 is a characteristic diagram showing signal waveforms at each part of the circuit in the embodiment of FIG. 8.

Increment or decrement of load is then explained hereunder. For simplification, explanation is based on the profile variation shown in FIG. 9.

In case a setting signal P is enlarged at the time $t_1$, the measuring signal Q has a value before the change. Therefore, the output of the deviation detector H is increased only by variation of setting signal P, gradually increasing the output of the integrator S. Thereby, the number of rotations of motor 55 increases, followed by increase of flow rate of air and the measuring signal Q gradually increases.

The output of the deviation detector H is added with the output of the signal generator SG in the adder AD. The combined output is then converted to a pressure and is then applied to the damper 58, increasing the opening angle $\theta$ (in the direction where amount of air increases) of the damper body 58b. With the multiplied effect of increase in rotating speed of motor 55 and enlarged opening angle $\theta$ of damper body 58b, flow rate of air rises up to the desired value with good response and deviation H from preset flow rate value P decreases gradually and finally becomes 0 (time $t_2$). Thereby the output of integrator S is stabilized to a new value, the number of rotations of motor 55 is also stabilized and the opening angle of the damper body 58b is returned to the specified value $\theta_c$.

The explanation for increase can also be adopted to decrease of setting signal P at the time $t_3$. In this case, however, since the output of the deviation detector H is reduced as much as the reduction of the setting signal P, the number of rotations of motor 55 is reduced and the opening angle $\theta$ of the damper 58b is also reduced. The multiplied effect of these changes the flow rate of air to be reduced quickly to the desired value.

In the above explanation, a certain time delay may be provided for variation of output of adder AD in order to delay for a short period of time the response rate for frequency changes of setting signal P of setting device (not shown) to achieve stability of control.

Moreover, on the occasion of adding the output of the deviation detector H and the output of the signal generator SG, a deviation input to the adder is set to zero or the value above the specified value is cut in accordance with a fine output of the deviation detector H or excessive output thereof by using, for example, a limiter in order to ensure stable control and safe operation.

In the above embodiment, the fan 56 is used as the load of motor 55, but it may be replaced with other fluid moving means such as a pump or compressor and therefore the damper body 58b can also be replaced with other equivalent devices.

In this embodiment, air is employed as the load but it can also be replaced with water or other fluid.

Moreover, the outputs of the integrator S and adder AD are respectively applied to the VVVF 52 and damper 58 through the voltage/current converter E/I and voltage/pressure converter E/P, but these can also be applied to other first and second signal conversion means if these conform to the controls.

In the above embodiment, the setting signal generator SG outputs the signal which specifies the opening angle of the damper 8. However, this invention is not limited to such embodiment and the setting signal generator SG may be structured to output a signal for setting to a definite value a physical amount, such as revolving speed of the motor 55 or the amount of the wind flowing through the fluid flowing path 59.

Figure 10:
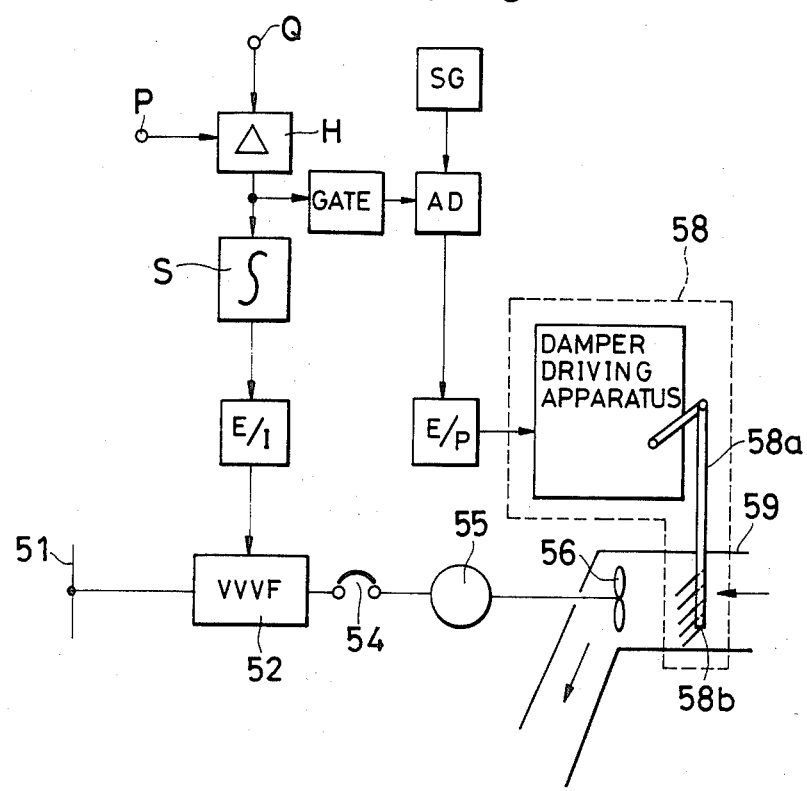
FIG. 10 is a block diagram showing the third embodiment of the present invention.
Figure 11:
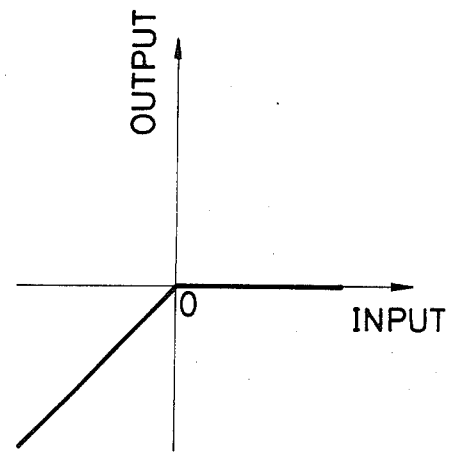
FIG. 11 is a characteristic diagram showing the input/output characteristic of the embodiment of FIG. 10.
Figure 12:
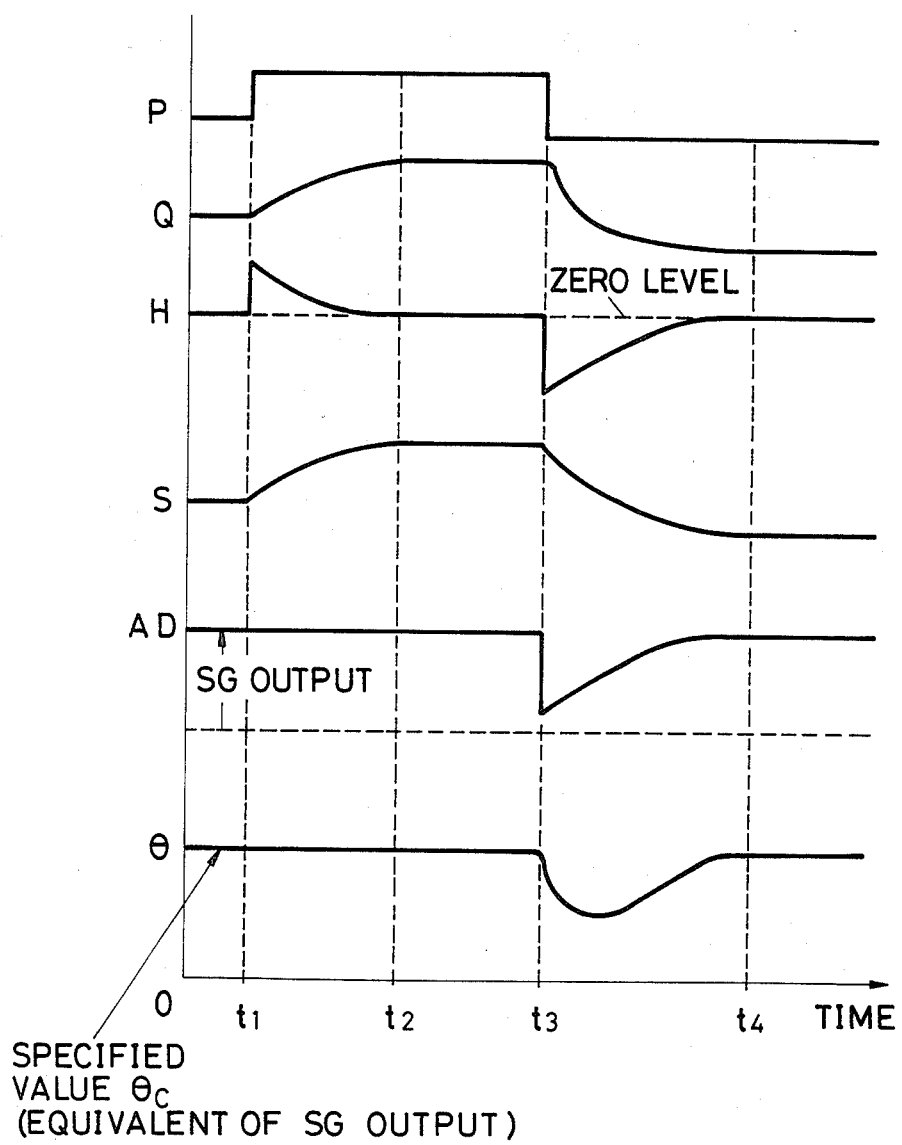
FIG. 12 is a characteristic diagram showing signal waveforms at each part of the circuit in the embodiment of FIG. 10.

The third embodiment of the present invention is explained by referring to FIGS. 10 to 12. In FIG. 10, GATE is a gate circuit and the other components are the same as those in the structure shown in FIG. 8. That is, like elements are given like reference numerals and the description thereof is not repeated.

Operations of structure shown in FIG. 10 are explained hereunder. The gate circuit GATE has, for example, the input/output characteristic as shown in FIG. 11. It is responsive to an output of the deviation detector H and provides the output 0 when an input is positive or provides a direct output when the input is negative.

Operations of FIG. 10 are explained on the basis of FIG. 12 which shows signal waveforms. First, when the setting signal P matches the measuring signal Q, the motor is operating at a constant number of rotations as in the case of the second embodiment, and the damper 58b is set to the specified opening angle.

Here assumed is the case where a setting signal P becomes large at the time $t_1$, and the output $H=P-Q$ of the deviation detector increases (positive). The output of the gate circuit GATE is zero, and the opening angle of damper is fixed to the specified angle $\theta_c$. The output of the deviation detector H is applied to the integrator S, increasing the output thereof. Thereby the output frequency of VVVF 52 increases, and the number of rotations of motor 55 rises. As a result, the flow rate as a load is raised up to the setting signal P.

Response to such increase of flow rate is carried out by VVVF 52. When the acceleration torque of motor 55 is large, such response speed can be raised up to a value which does not result in problem for practical use. The power supply capacity of VVVF 52 must be increased in order to raise the acceleration torque of motor 55, but VVVF 52 has a certain margin in addition to the ordinary capacity and therefore it copes with such requirement.

Next, the case where the setting signal P is decreased at the time $t_3$ is explained hereunder. In this case, the output of the deviation detector H is reduced (negative) and the gate circuit GATE provides an output. Therefore, the response is carried out with a reduction in the number of rotations and operation of opening angle of damper in the closing direction as in the case of the second embodiment explained with reference to FIG. 8.

Because of the operations explained above, it is enough if the opening angle of damper can be controlled only in the closing direction from the specified opening angle and therefore the specified opening angle can be set to a value (for example, about 70°~80°) near the full opening and energy saving can be realized.

In above embodiment the fan 56 is used as the load of motor 55, but it may be replaced with other rotating body such as a pump, compressor, etc. and the damper body 58b can also be replaced with other mechanical control means.

In addition, the air is considered as while load in above embodiment, other fluids such as water can also be used to obtain the same effect as explained above.

Further, outputs of the integrator S and adder AD are applied respectively to the VVVF 2 and damper driving apparatus 58 through voltage/current converter E/I and voltage/pressure converter E/P, but it is apparent that these can be applied to the other first and second means if these are suitable for the control. In above explanation, the signal generator SG is used for obtaining an output of a specified value, but such output may be a function of a number of rotations or flow rate, etc.

In the above explanation, a certain time delay may be provided for variation of output of adder AD in order to delay for a short period of time the response rate for frequency changes of setting signal P of setting device (not shown) to achieve stability of control.

While a negative value of the output of the deviation detector H is directly used as an output of the gate circuit GATE in the above embodiment, an output corresponding to a negative value such as a proportional value may also be used as an output of the gate circuit GATE.

As explained above, according to the flow rate control system in the fluid supply and draining apparatus incorporated to the present invention, since the motor is so controlled that the number of the rotations of fluid flowing means changes like a staircase, operations can be executed avoiding the mechanical resonance point of the fluid flowing means thereby resulting in the the effects that the motor can be operated safely and breakdown failure of fluid flowing means can be prevented.

Moreover, the present invention also provides the effect that a quick load response rate can be obtained since control is carried out through the response of the number of rotations and fluid flow rate control means to increase or decrease of load of the fluid flowing means, and a small size flow rate control system can be employed because the recovery braking is not required.

In addition, since the structure permits both the number of rotations and flow rate control means to be responsive only to reduction in load of the fluid flowing means, the specified opening angle of the flow rate control means can be set to almost full opening angle and the load response speed explained above can further be improved and reduction in size of system can be realized.

What is claimed is:

1. A flow rate control system in fluid supply and drain apparatus comprising;
   a motor to be driven by a variable frequency power supply whose output frequency changes on the basis of a command request of load, said variable frequency power supply providing an output,
   a fluid flowing means which is rotatably driven by said motor and provided in the flow path of fluid,
   a flow rate control means which mechanically controls flow rate of fluid which is a load of said fluid flowing means,
   a deviation detector which detects deviation between a preset value of flow rate of said fluid and actually measured flow rate of fluid and provides an output,
   an integrator which proportionally integrates the output of said deviation detector and provides an output,
   a first control means which inputs the output of said integrator to said variable frequency power supply,
   a setting signal generator which designates necessary control of flowing fluid to a predetermined value while said motor is being controlled to the specified operating condition by the output of said variable frequency power supply,
   an adder which adds the output of said setting signal generator and the output of said deviation detector and provides an output, and
   a second control means which inputs the output of said adder to said flow rate control means.

2. A flow rate control system in fluid supply and drain apparatus as defined in claim 1, wherein said fluid flowin means is formed by a motor-driven fan which is rotatably driven by said motor and said flow rate control means is formed by a damper.

3. A flow rate control system in fluid supply and drain apparatus as defined in claim 1, wherein the number of rotations of said motor is controlled step by step on the basis of the flow rate of said fluid and fine change of flow rate in each step is controlled by said flow control means.

4. A flow rate control system in fluid supply and drain apparatus as defined in claim 1, wherein a gate circuit which rejects the output from said deviation detector when it is positive and provides an output of said detector when it is negative as an input to said adder.

* * * * *

UNITED STATES PATENT AND TRADEMARK OFFICE
CERTIFICATE OF CORRECTION

PATENT NO. : 4,720,245

DATED : January 19, 1988

INVENTOR(S) : Nobuharu Takata et al.

It is certified that error appears in the above-identified patent and that said Letters Patent is hereby corrected as shown below:

Title page:

In the Abstract, line 4, "suply" should be --supply--.

Column 3, line 66, the numeral "25" should be --15--.

Column 4, line 17, "flo" should be --flow--.

Column 5, line 37, delete "-" between "the" and "continuous".

Column 8, line 66 should read as follows:
--In addition, while air is considered as the load in--.

Column 9, line 29, after "means" insert --,--.

Column 10, line 32, "flowin" should be --flowing--.

Signed and Sealed this

Twenty-first Day of February, 1989

Attest:

DONALD J. QUIGG

*Attesting Officer*　　　　*Commissioner of Patents and Trademarks*